United States Patent
Konji

(10) Patent No.: US 7,929,180 B2
(45) Date of Patent: Apr. 19, 2011

(54) PRINTING SYSTEM, PRINTING METHOD, AND HOST APPARATUS CAPABLE OF ANALYZING INK BLUR

(75) Inventor: Mitsuru Konji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1177 days.

(21) Appl. No.: 11/563,954

(22) Filed: Nov. 28, 2006

(65) Prior Publication Data

US 2007/0121143 A1 May 31, 2007

(30) Foreign Application Priority Data

Nov. 30, 2005 (JP) ................................. 2005-346971

(51) Int. Cl.
G06F 15/00 (2006.01)
(52) U.S. Cl. .......... 358/1.9; 358/3.2; 358/3.24; 382/255
(58) Field of Classification Search ................. 358/1.15, 358/3.19, 1.13, 1.14, 1.9, 3.2; 399/1; 382/254, 382/255, 258, 264, 266, 270, 272
See application file for complete search history.

(56) References Cited

U.S. PATENT DOCUMENTS

| | | | | |
|---|---|---|---|---|
| 5,467,434 A | * | 11/1995 | Hower et al. ................. | 358/1.15 |
| 5,633,670 A | * | 5/1997 | Kwak ............................ | 347/188 |
| 5,764,253 A | | 6/1998 | Uchikata et al. | |
| 6,412,897 B1 | | 7/2002 | Konishi et al. | |
| 6,650,361 B1 | * | 11/2003 | Shiomi ....................... | 348/218.1 |
| 7,181,082 B2 | * | 2/2007 | Feng ............................. | 382/255 |
| 7,321,690 B2 | * | 1/2008 | Lim et al. ..................... | 382/191 |
| 7,436,532 B2 | * | 10/2008 | Tsujimoto ..................... | 358/1.15 |
| 7,471,830 B2 | * | 12/2008 | Lim et al. ...................... | 382/181 |
| 7,570,391 B2 | * | 8/2009 | Hayaishi ....................... | 358/1.9 |
| 7,856,171 B2 | * | 12/2010 | Bang et al. ..................... | 396/52 |
| 2002/0070948 A1 | * | 6/2002 | Murai et al. ................... | 345/589 |
| 2003/0011717 A1 | * | 1/2003 | McConica ...................... | 348/699 |
| 2006/0120618 A1 | * | 6/2006 | Mizoguchi ..................... | 382/255 |

FOREIGN PATENT DOCUMENTS

| | | |
|---|---|---|
| JP | 06-210875 A | 8/1994 |
| JP | 2000-255043 A | 9/2000 |
| JP | 2003-150339 | 5/2003 |
| JP | 2003-305923 A | 10/2003 |
| JP | 2005-165407 A | 6/2005 |

OTHER PUBLICATIONS

Ilno Akio, Image Processor, May 20, 2004, English Translation JP 2004-142206.*
Office Action—Appln. No. 2005-346971, Japanese Patent Office, Dec. 22, 2009.

* cited by examiner

*Primary Examiner* — Twyler L Haskins
*Assistant Examiner* — Dennis Dicker
(74) *Attorney, Agent, or Firm* — Fitzpatrick, Cella, Harper & Scinto

(57) ABSTRACT

A printing system, printing method, and host apparatus is capable of analyzing the degree of ink blur in consideration of print conditions and the properties of an image typified by a photograph or the like, and prompting a user to change the print conditions depending on the analysis result. The system sets print conditions upon printing an image on a printing medium via a man-machine interactive operation by the user. If the system determines that ink blurs upon printing on the printing medium on the basis of the generated print data in accordance with the set print conditions, it warns the user about the print conditions.

8 Claims, 17 Drawing Sheets

FIG. 8

| PAPER TYPE | PRINT QUALITY | BLUR OCCURRENCE TONE RANGE | |
|---|---|---|---|
| | | TONE LEVEL min. | TONE LEVEL max. |
| PLAIN PAPER | FINE | 0 | 180 |
| | FAST | 0 | 140 |
| PHOTO PAPER A | FINE | 0 | 50 |
| | FAST | 0 | 20 |
| ... | | ... | |

FIG. 11

| PAPER TYPE | PRINT QUALITY | BLUR OCCURRENCE TONE RANGE | |
|---|---|---|---|
| | | TONE LEVEL min. | TONE LEVEL max. |
| PLAIN PAPER | FINE | 0 | 150 |
| | FAST | 0 | 120 |
| PHOTO PAPER A | FINE | — | — |
| | FAST | — | — |
| ⋮ | | ⋮ | |

PRINTING SYSTEM, PRINTING METHOD, AND HOST APPARATUS CAPABLE OF ANALYZING INK BLUR

BACKGROUND OF THE INVENTION

1. Field of the Invention

The present invention relates to a printing system, printing method, and host apparatus. Particularly, the present invention relates to a printing system, printing method, and host apparatus which prevent the occurrence of an ink blur in an image printed using an inkjet printing apparatus.

2. Description of the Related Art

Conventionally, there has sometimes occurred a blur in a printing result due to compatibility between ink and a printing medium in an inkjet printing apparatus (to be referred to as a printing apparatus hereinafter) which prints by discharging ink from the nozzles of a printhead onto the printing medium. The blur causes distorted-looking characters, and makes it difficult to identify them.

To solve this problem, for example, Japanese Patent Publication Laid-Open No. 2003-150339 proposes a technique of checking the sizes of characters contained in a text to be printed, and if the character size is equal to or smaller than a predetermined value, determining that the characters are distorted and is not recognizable, and halting printing.

With excellent features such as high print quality and high color reproducibility, printing apparatuses are not limited to text printing, and cover even creative fields such as advertising and publishing. In particular, a growing number of users use printing apparatuses for photo printing. Generally when printing a plurality of photographs, the printing apparatus executes so-called index printing: evenly laying out a plurality of photographs in an area corresponding to one printing medium in order to provide an easy-to-see list.

However, the conventional technique requires reprinting because the ink blur degrades print quality to a point below that necessary to browse the printing result, wasting ink and printing media.

In photo printing applications, the ink blur degrades print quality, failing to accurately represent details of a photograph.

SUMMARY OF THE INVENTION

Accordingly, the present invention is conceived as a response to the above-described disadvantages of the conventional art.

For example, a printing system, printing method, and host apparatus according to this invention are capable of analyzing the degree of ink blur in consideration of image properties and print conditions, and prompting a user to change the print conditions depending on the analysis result.

According to one aspect of the present invention, preferably, there is provided a printing system including: a host apparatus which generates print data; and an inkjet printing apparatus which prints an image on a printing medium using the print data transferred from the host apparatus, wherein the host apparatus comprises: a generation unit adapted to generate the print data; a setting unit adapted to set a print condition upon printing an image on the printing medium by a man-machine interactive operation by a user; an analysis unit adapted to analyze whether or not ink blurs upon printing on the printing medium on the basis of the print data generated by the generation unit in accordance with the print condition set by the setting unit; and a warning unit adapted to warn the user about the set print condition in accordance with an analysis result by the analysis unit.

According to another aspect of the present invention, preferably, there is provided a method of controlling a printing system having a host apparatus which generates print data, and an inkjet printing apparatus which prints an image on a printing medium using the print data transferred from the host apparatus, comprising the steps of: generating the print data; setting a print condition upon printing an image on the printing medium by a man-machine interactive operation by a user; analyzing whether or not ink blurs upon printing on the printing medium on the basis of the print data generated in the generating step in accordance with the print condition set in the setting step; warning the user about the set print condition in accordance with an analysis result in the analyzing step; and transferring the print condition set in the setting step and the print data generated in the generating step from the host apparatus to the printing apparatus in order to print by the printing apparatus.

According to still another aspect of the present invention, preferably, there is provided a host apparatus which generates print data and transfers the generated print data to an inkjet printing apparatus, comprising: a generation unit adapted to generate the print data; a setting unit adapted to set a print condition upon printing an image on a printing medium in the inkjet printing apparatus by a man-machine interactive operation by a user; an analysis unit adapted to analyze whether or not ink blurs upon printing on the printing medium by the inkjet printing apparatus on the basis of the print data generated by the generation unit in accordance with the print condition set by the setting unit; and a warning unit adapted to warn the user about the set print condition in accordance with an analysis result by the analysis unit.

The analysis unit desirably includes a conversion unit adapted to convert the print data into grayscale data, a determination unit adapted to determine for each pixel whether a value of the grayscale data falls within values defining a range where a blur occurs, a calculation unit adapted to calculate a ratio of pixels suffering a blur to all pixels of an image represented by the print data in accordance with a determination result by the determination unit, a comparison unit adapted to compare the ratio calculated by the calculation unit with a specific threshold, and a decision unit adapted to decide, from a comparison result by the comparison unit, whether or not an intolerable blur occurs in the image.

The values defining the range where a blur occurs is desirably variably set in accordance with a type of the printing medium and a print quality of printing by the inkjet printing apparatus, and more desirably variably set in accordance with the number of images laid out on one printing medium.

The warning unit preferably displays, on a screen, a message which prompts the user to stop printing, and a message which prompts the user to change a setting of the print condition.

The display preferably previews an image printed under the print condition whose setting is changed in accordance with the message.

According to still another aspect of the present invention, preferably, there is provided a program which causes a computer to execute the steps of the printing method having the above steps.

According to still another aspect of the present invention, preferably, there is provided a computer-readable medium which stores the program.

The invention is particularly advantageous since the degree of ink blur can be analyzed in consideration of print conditions and the properties of an original image typified by a photograph or the like, and a user can be warned in accordance with the analysis result. The user can print an image by changing print conditions or the like, and avoid printing an image degraded in quality due to the ink blur. This contributes to reducing wasteful consumption of ink and printing media, and improving the layout printing quality.

Further features of the present invention will become apparent from the following description of exemplary embodiments (with reference to the attached drawings).

BRIEF DESCRIPTION OF THE DRAWINGS

FIG. 8 is a table showing the blur occurrence tone range when the layout count is 80;

FIG. 11 is a table showing the blur occurrence tone range when the layout count is 63;

DESCRIPTION OF THE EMBODIMENTS

Preferred embodiments of the present invention will now be described in detail in accordance with the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink (e.g., can solidify or insolubilize a coloring agent contained in ink applied to the print medium).

Furthermore, unless otherwise stated, the term "nozzle" generally means a set of a discharge orifice, a liquid channel connected to the orifice and an element to generate energy utilized for ink discharge.

<Outline of Printing System (FIGS. 1 and 2)>

Figure 1:
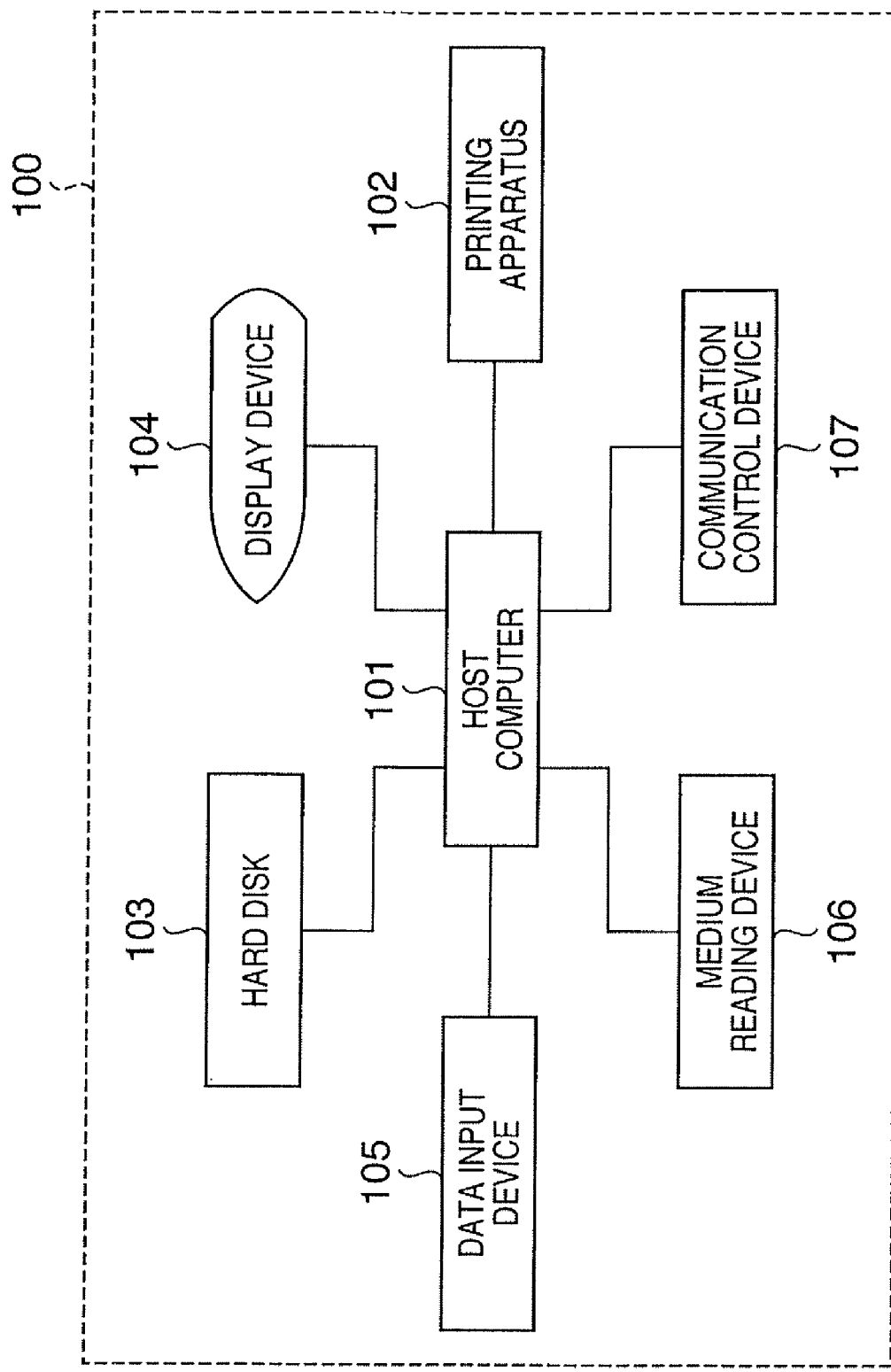
FIG. 1 is a block diagram showing the configuration of a printing system as a typical embodiment of the present invention.

FIG. 1 is a block diagram showing the schematic configuration of a printing system 100 as a typical embodiment of the present invention. In the printing system 100, a printing apparatus 102 prints, on a printing medium, print data such as a document or image created by an application capable of running on a host computer (to be referred to as a host hereinafter) 101.

As shown in FIG. 1, the printing system 100 is built by connecting the printing apparatus 102, a hard disk 103, a display device 104, a data input device 105, a medium reading device 106, and a communication control device 107 to the host 101. The host 101 executes a predetermined system program to control and monitor the whole operation of the printing system 100.

The host 101 has various building elements including a CPU, RAM, and ROM, which are integrated on a system board. The CPU controls the overall operation of the printing system 100 by properly reading out a predetermined processing program from the ROM, hard disk 103, or the like and executing the readout program. In this embodiment, the hard disk 103 stores various programs to be executed by the host 101. The hard disk 103 stores processing programs for implementing operations according to the embodiment, various applications for generating print data, and the like.

The storage of processing programs (program codes) for implementing operations according to the embodiment is not limited to the hard disk 103 or an internal memory such as a ROM. For example, a portable storage medium such as a CD-ROM or flexible disk may store processing programs in a format which allows the host 101 to read them, and may be distributed. In constructing the printing system 100, the host 101 may read the processing programs via the medium reading device 106 or communication control device 107 and install the read programs in the hard disk 103.

The embodiment will adopt, e.g., Windows® as the OS (Operating System) of the host 101, but the OS is not limited to this.

When receiving information such as print conditions from the host 101 together with print data, the printing apparatus 102 executes a predetermined printing operation to print an image on a printing medium on the basis of the received print data. The printing apparatus 102 is an inkjet printing apparatus to be described later. The printing apparatus 102 and host 101 one-to-one-connect to each other, but can employ various connection configurations such as 1-to-n network connection.

The display device 104 displays various windows on the display in accordance with instructions from the host 101 upon executing a system program, application, or the like. The data input device 105 includes a keyboard, mouse®, another pointing device, and the like. The data input device 105 accepts various instructions from a user and notifies the host 101 of them. The instructions include the setting contents of print conditions from the user to the printing apparatus 102.

The medium reading device 106 includes a CD-ROM drive, flexible disk (FD) drive, and the like, and transfers information read from storage media such as a CD-ROM and FD to the host 101. The communication control device 107 is, e.g., a connection interface for communicably connecting the printing system 100 to an external network.

Figure 2:
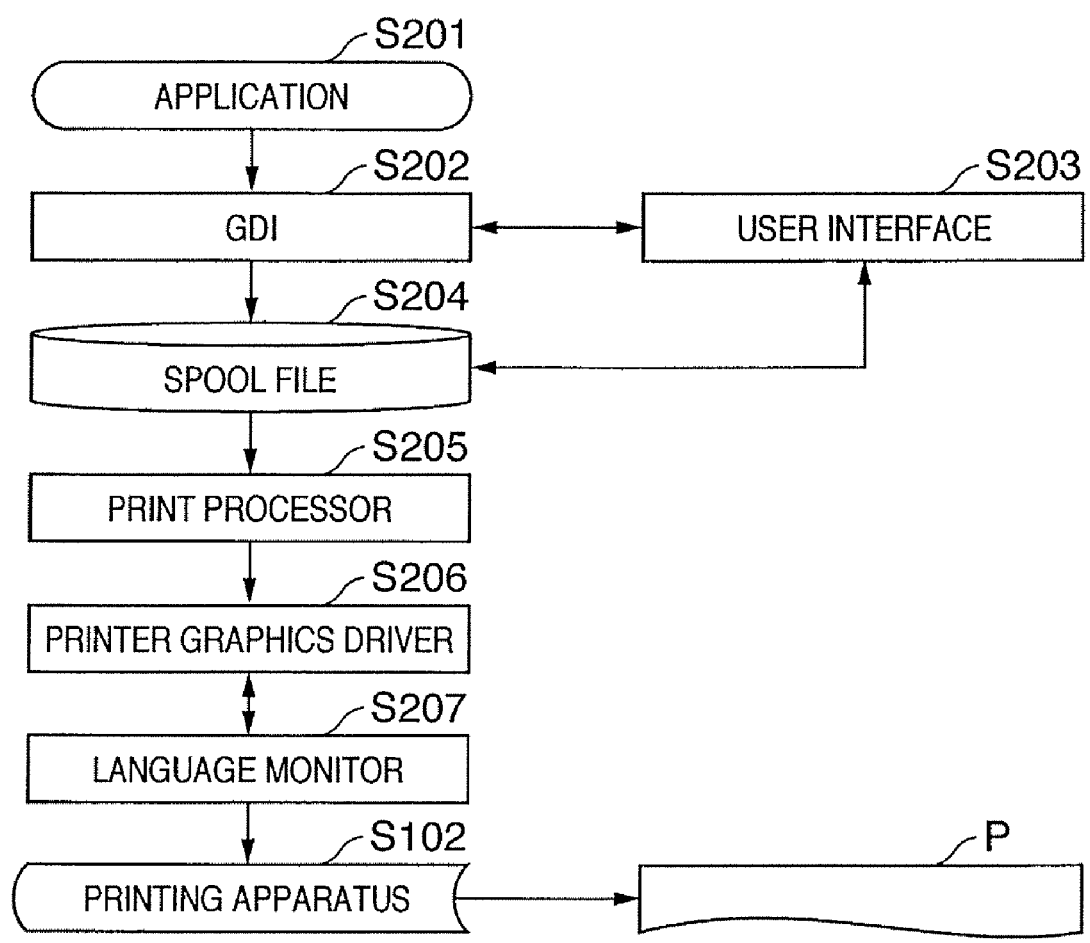
FIG. 2 is a block diagram showing the printing control function of the printing system shown in FIG. 1.

FIG. 2 is a block diagram showing a printing control function executed by the host.

As shown in FIG. 2, the printing control function by the host 101 includes an application 201, GDI (Graphic Device Interface) 202, user interface driver 203, spool file 204, print processor 205, printer graphics driver 206, and language monitor 207.

Main functions included in the printing control function by the host 101 will be explained.

The user interface driver 203 has a function of setting print conditions such as the paper size used for printing to the printing apparatus 102 via the GDI 202.

The print processor 205 has a function of processing print data stored in the spool file 204 every printing medium page. For example, the print processor 205 executes page layout such as layout printing based on print data, details of which will be described later. The printer graphics driver 206 has a function of converting print data into a format capable of printing out by the printing apparatus 102. The language monitor 207 performs bi-directional communication with the printing apparatus 102. Through this communication, the host 101 acquires information of the printing apparatus 102, displays it on the display device 104, and transfers data generated by the printer graphics driver 206 to the printing apparatus 102.

A series of operations of the printing control function by the host 101 will be described.

The application 201 creates any desired print data in accordance with an operation instruction from a user, and instructs execution of printing. In response to this, the GDI 202 notifies the user interface driver 203 of a printing start event. The application 201 stores the print data in the spool file 204 via the GDI 202. At this time, the spool file 204 has stored in advance the setting contents of print conditions for the printing apparatus 102 via the user interface driver 203.

The print processor 205 acquires the print data and the setting contents of print conditions from the spool file 204, and supplies them to the printer graphics driver 206 every printing medium page.

The printer graphics driver 206 inquires, of the language monitor 207, the type of interface used to transmit print data from the host 101 to the printing apparatus 102 via an arbitrary data transmission/reception unit (not shown).

The language monitor 207 responds to the interface type inquiry from the printer graphics driver 206. That is, the language monitor 207 determines the type of interface used to transmit print data from the host 101 to the printing apparatus 102, and notifies the printer graphics driver 206 of the determined interface type.

The printer graphics driver 206 generates a graphics drawing command generated by the GDI 202, and print data (to be referred to as print image data hereinafter) on the basis of the setting contents of print conditions notified in advance from the print processor 205. In generating the data, the printer graphics driver 206 performs color processing and the like on print page data supplied from the print processor 205. The printer graphics driver 206 supplies the print image data to the language monitor 207 via an arbitrary data transmission unit (not shown).

The language monitor 207 supplies the print image data received from the printer graphics driver 206 to the printing apparatus 102 via an interface used to transmit print data from the host 101 to the printing apparatus 102.

The printing apparatus 102 prints the image on a printing medium P on the basis of the print image data supplied from the language monitor 207.

<Description of Inkjet Printing Apparatus (FIG. 3)>

Figure 3:
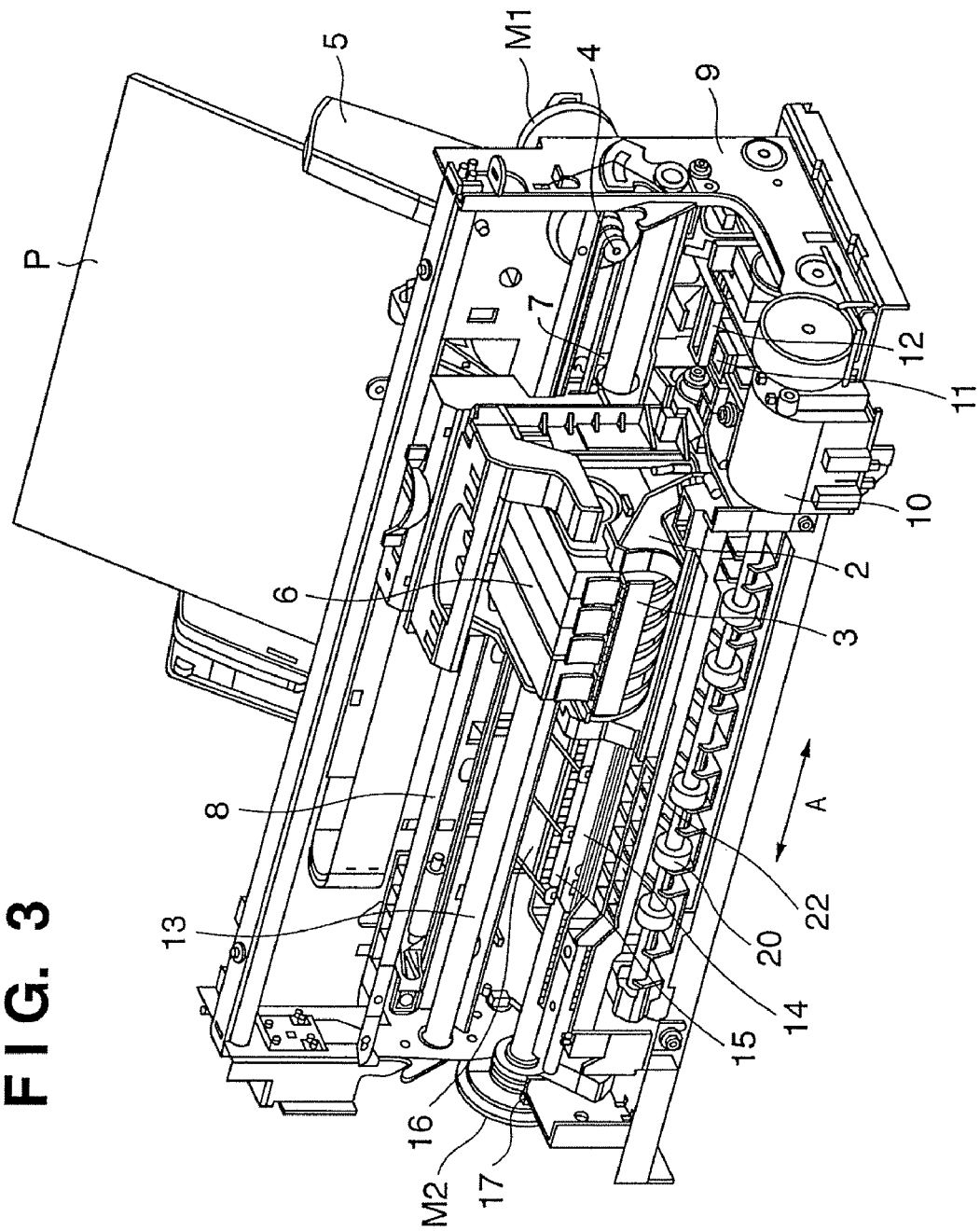
FIG. 3 is a perspective view showing the schematic outer structure of the inkjet printing apparatus of the printing system shown in FIG. 1.

FIG. 3 is a perspective view showing the schematic outer structure of the inkjet printing apparatus 102.

In the inkjet printing apparatus 102 (to be referred to as a printing apparatus hereinafter), as shown in FIG. 3, a carriage 2 supports a printhead 3 for printing by discharging ink according to the inkjet printing method. A transmission mechanism 4 transmits a driving force generated by a carriage motor M1 to the carriage 2, and reciprocates the carriage 2 in a direction indicated by an arrow A. In printing, the printing medium P such as a printing sheet is fed via a paper feed mechanism 5 and conveyed to a print position. At the print position, the printhead 3 discharges ink to the printing medium P to print.

To maintain a good state of the printhead 3, the carriage 2 moves to the position of a recovery device 10, which intermittently executes a discharge recovery operation for the printhead 3.

The carriage 2 of the printing apparatus 102 supports not only the printhead 3, but also an ink cartridge 6 which stores ink to be supplied to the printhead 3. The ink cartridge 6 is detachable from the carriage 2.

The printing apparatus 102 shown in FIG. 3 can print in color. For this purpose, the carriage 2 supports four ink cartridges which respectively store magenta (M), cyan (C), yellow (Y), and black (K) inks. The four ink cartridges are independently detachable.

The carriage 2 and printhead 3 can achieve and maintain a predetermined electrical connection by properly bringing their contact surfaces into contact with each other. The printhead 3 selectively discharges ink from a plurality of orifices and prints by applying energy in accordance with the print signal. In particular, the printhead 3 according to the embodiment adopts an inkjet method of discharging ink by using thermal energy. For this purpose, the printhead 3 comprises an electrothermal transducer for generating thermal energy. Electric energy applied to the electrothermal transducer is converted into thermal energy. Ink is discharged from orifices by using a change in pressure upon growth and shrinkage of bubbles by film boiling generated by applying the thermal energy to ink. The electrothermal transducer is arranged in correspondence with each orifice, and ink is discharged from a corresponding orifice by applying a pulse voltage to a corresponding electrothermal transducer in accordance with the print signal.

As shown in FIG. 3, the carriage 2 is coupled to part of a driving belt 7 of the transmission mechanism 4 which transmits the driving force of the carriage motor M1. The carriage 2 is slidably guided and supported along a guide shaft 13 in the direction indicated by the arrow A. The carriage 2 reciprocates along the guide shaft 13 by normal rotation and reverse rotation of the carriage motor M1. A scale 8 representing the absolute position of the carriage 2 is arranged along the moving direction (direction indicated by the arrow A) of the carriage 2. In the embodiment, the scale 8 is prepared by printing black bars on a transparent PET film at a necessary pitch. One end of the scale 8 is fixed to a chassis 9, and its other end is supported by a leaf spring (not shown).

The printing apparatus 102 has a platen (not shown) facing the orifice surface of the printhead 3 having orifices (not shown). The carriage 2 supporting the printhead 3 reciprocates by the driving force of the carriage motor M1. At the same time, the printhead 3 receives a print signal to discharge ink and print on the entire width of the printing medium P conveyed onto the platen.

In FIG. 3, reference numeral 14 denotes a conveyance roller driven by a conveyance motor M2 in order to convey the printing medium P; 15, a pinch roller which makes the printing medium P abut against the conveyance roller 14 by a spring (not shown); 16, a pinch roller holder which rotatably supports the pinch roller 15; and 17, a conveyance roller gear fixed to one end of the conveyance roller 14. The conveyance roller 14 is driven by rotation of the conveyance motor M2 that is transmitted to the conveyance roller gear 17 via an intermediate gear (not shown).

Reference numeral 20 denotes a discharge roller which discharges the printing medium P bearing an image formed by the printhead 3 outside the printing apparatus. The discharge roller 20 is driven by transmitting rotation of the conveyance motor M2. The discharge roller 20 abuts against a spur roller (not shown) which presses the printing medium P by a spring (not shown). Reference numeral 22 denotes a spur holder which rotatably supports the spur roller.

In the printing apparatus 102, the recovery device 10 for recovering the printhead 3 from a discharge failure is arranged at a desired position (e.g., a position-corresponding to the home position) outside the reciprocation range (outside the printing area) for the printing operation of the carriage 2 supporting the printhead 3.

The recovery device 10 comprises a capping mechanism 11 which caps the orifice surface of the printhead 3, and a wiping mechanism 12 which cleans the orifice surface of the printhead 3. The recovery device 10 performs a discharge recovery operation. For example, the recovery device 10 removes ink with a high viscosity or bubbles from the ink channel of the printhead 3 by forcibly discharging ink from orifices by suction means (suction pump or the like) within the recovery device in synchronism with capping of the orifice surface by the capping mechanism 11.

In a non-printing operation or the like, the capping mechanism 11 caps the orifice surface of the printhead 3 to protect the printhead 3 and prevent evaporation and drying of ink. The wiping mechanism 12 is arranged near the capping mechanism 11, and wipes ink droplets attached to the orifice surface of the printhead 3.

The capping mechanism 11 and wiping mechanism 12 can maintain a normal ink discharge state of the printhead 3.

<Control Arrangement of Inkjet Printing Apparatus (FIG. 4)>

Figure 4:
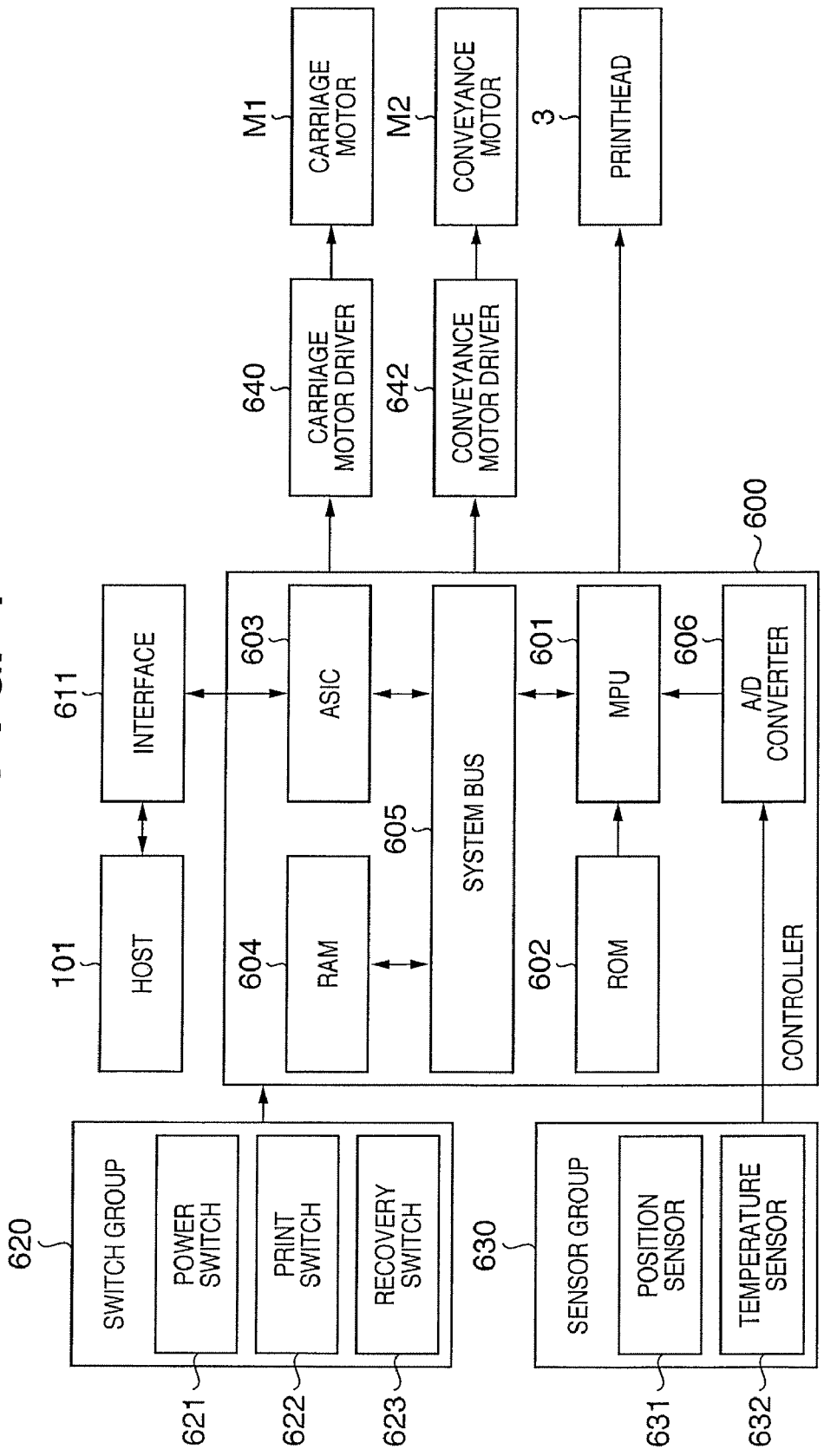
FIG. 4 is a block diagram showing the control arrangement of the printing apparatus shown in FIG. 3.

FIG. 4 is a block diagram showing the control arrangement of the printing apparatus shown in FIG. 3.

As shown in FIG. 4, a controller 600 comprises an MPU 601, ROM 602, application specific integrated circuit (ASIC) 603, RAM 604, system bus 605, and A/D converter 606. The ROM 602 stores a program corresponding to a control sequence (to be described later), a predetermined table, and other permanent data. The ASIC 603 generates control signals for controlling the carriage motor M1, conveyance motor M2, and printhead 3. The RAM 604 provides an image data expansion area, a work area for executing a program, and the like. The system bus 605 connects the MPU 601, ASIC 603, and RAM 604 to each other, and allows exchanging data. The A/D converter 606 receives analog signals from a sensor group (to be described below), A/D-converts them, and supplies digital signals to the MPU 601.

In FIG. 4, the host 101 is a host computer (or an image reader, digital camera, or the like) which serves as an image data source. The host 101 and printing apparatus 102 transmit/receive image data, commands, status signals, and the like via an interface (I/F) 611.

Reference numeral 620 denotes a switch group having a power supply switch 621, print switch 622, and recovery switch 623. The print switch 622 is used for designating the start of printing. The recovery switch 623 is used for designating start-up of a process (recovery process) to maintain good ink discharge performance of the printhead 3. These switches receive instruction inputs from an operator.

Reference numeral 630 denotes a sensor group which detects an apparatus state and includes a position sensor 631 and temperature sensor 632. The position sensor 631 such as a photocoupler detects a home position h. The temperature sensor 632 is arranged at a proper portion of the printing apparatus in order to detect the ambient temperature.

Reference numeral 640 denotes a carriage motor driver which drives the carriage motor M1 for reciprocating the carriage 2 in the direction indicated by the arrow A; and 642, a conveyance motor driver which drives the conveyance motor M2 for conveying the printing medium P.

A process to prevent occurrence of a blur by the printing system having the above configuration will be explained.

Figure 5:
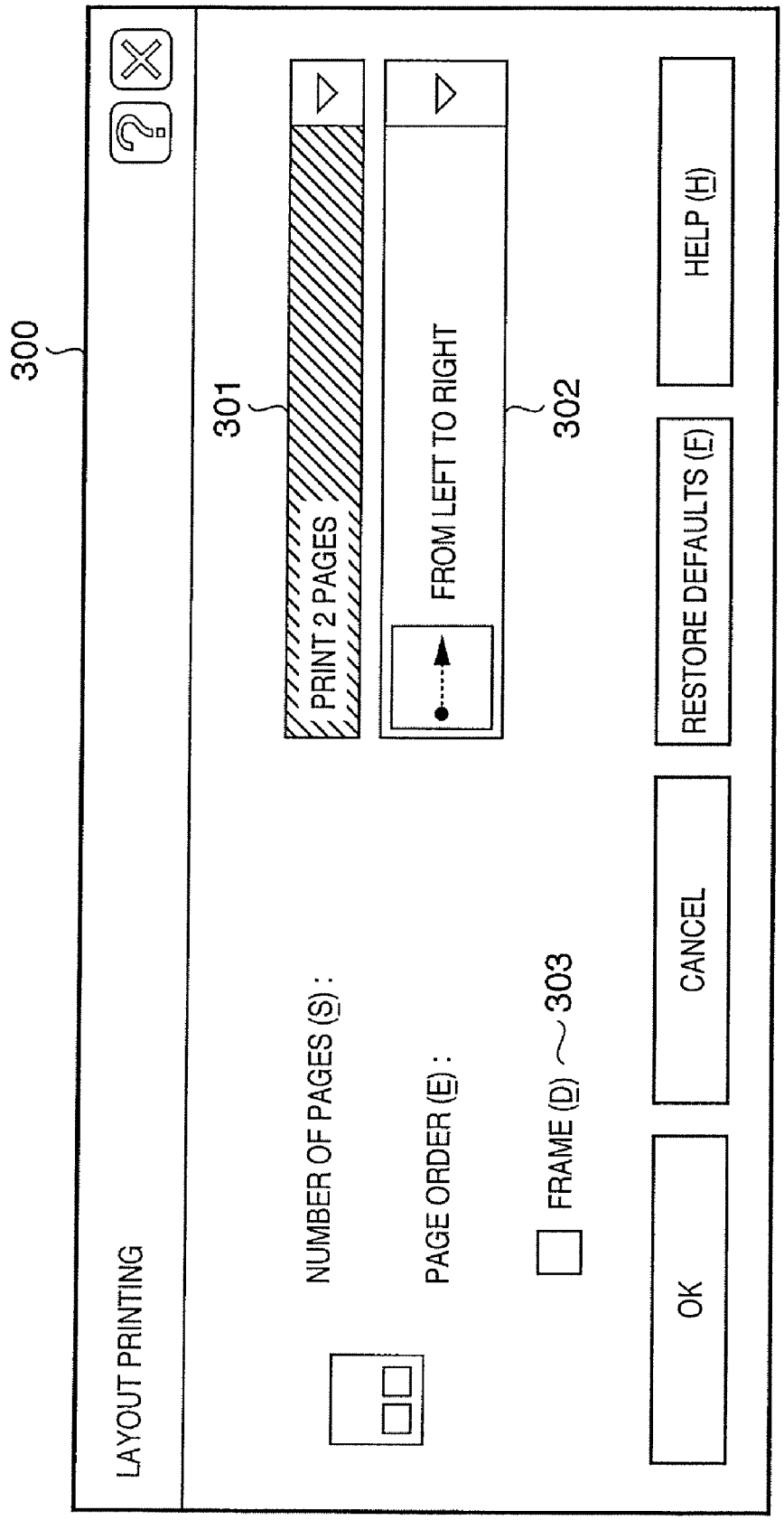
FIG. 5 is a view showing an example of a setup window displayed on a display device 104 in order to set layout printing through a user interface driver 203.

FIG. 5 is a view showing an example of a setup window displayed on the display device 104 in order to set layout printing through the user interface driver 203.

In FIG. 5, reference numeral 301 denotes a field for designating the number of printed image(s) to be laid out on a printing medium; 302, a field for selecting the layout direction of printed images; and 303, a field for selecting whether to print a frame around printed image(s) to be laid out. A user makes desired selections from these fields, and the user interface driver 203 stores the selected information in the spool file 204.

Figure 6:
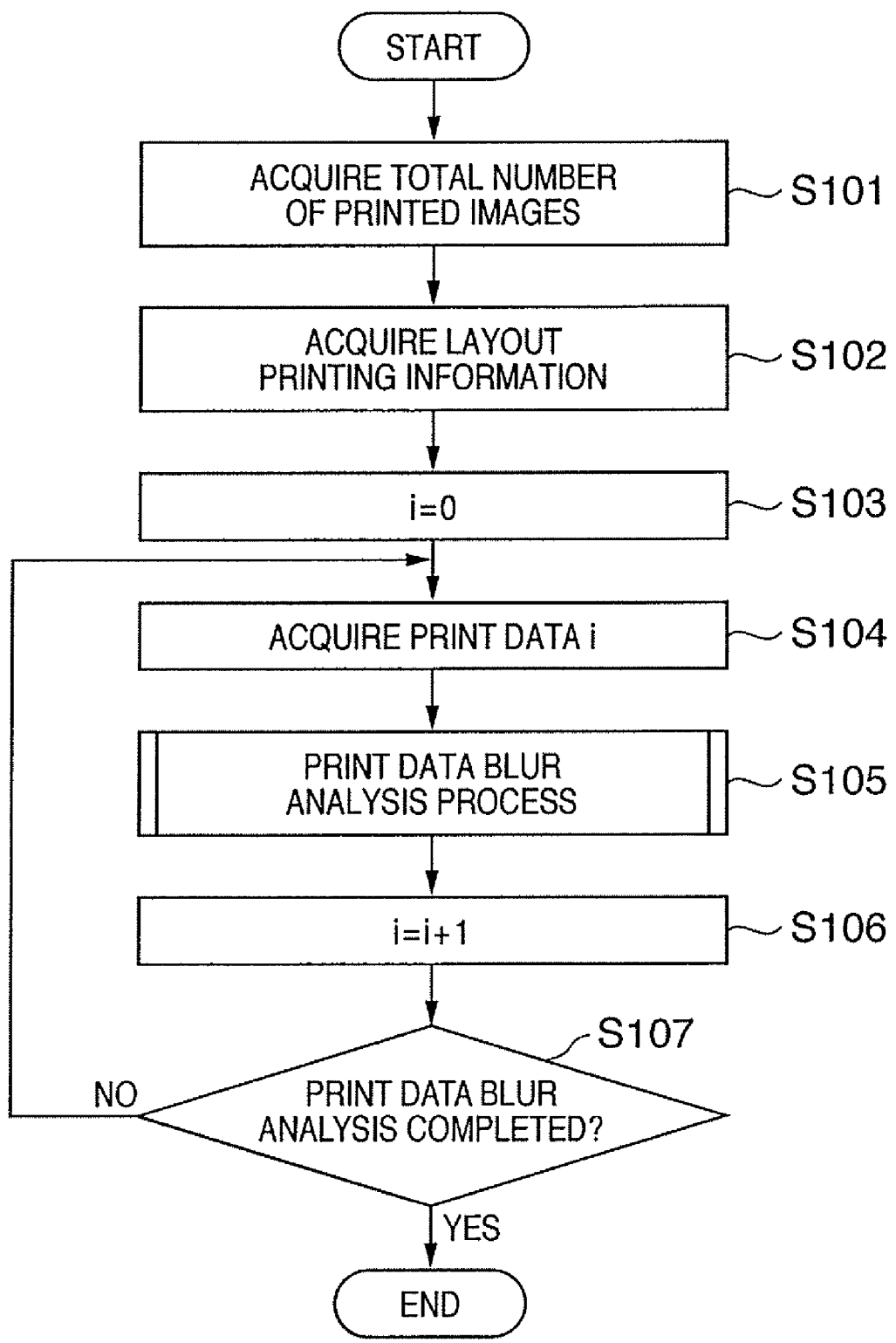
FIG. 6 is a flowchart showing an analysis process associated with an ink blur in a print data layout printing process executed by a print processor 205.

FIG. 6 is a flowchart showing an analysis process associated with an ink blur in a printed image layout printing process executed by the print processor 205.

In step S101, the print processor 205 acquires the total number of printed image(s) in a printing process. The process advances to step S102 to acquire information on layout printing set through the user interface driver 203, i.e., the layout count from the spool file 204.

After acquiring information on layout printing, the process advances to step S103 to initialize i=0, which is a number (to be referred to as a printed image specifying number i hereinafter) for designating specific printed image among all print data to be printed. The process advances to step S104 to acquire print data (to be referred to as print data i hereinafter) corresponding to the printed image specifying number i from the spool file 204.

The process advances to step S105 to execute a print data blur analysis process for the acquired print data i. In layout printing, the print processor 205 checks whether a blur occurs upon printing the print data i. If necessary, the print processor 205 performs a blur prevention process, details of which will be described later.

After the print data blur analysis process, the process advances to step S106 to increment the value of the printed image specifying number i by "+1". The process advances to step S107 to check whether all print data have undergone the print data blur analysis process. If the print processor 205 determines that the process does not end, the process returns to step S104 to perform the print data blur analysis process for all print data.

Figure 7:
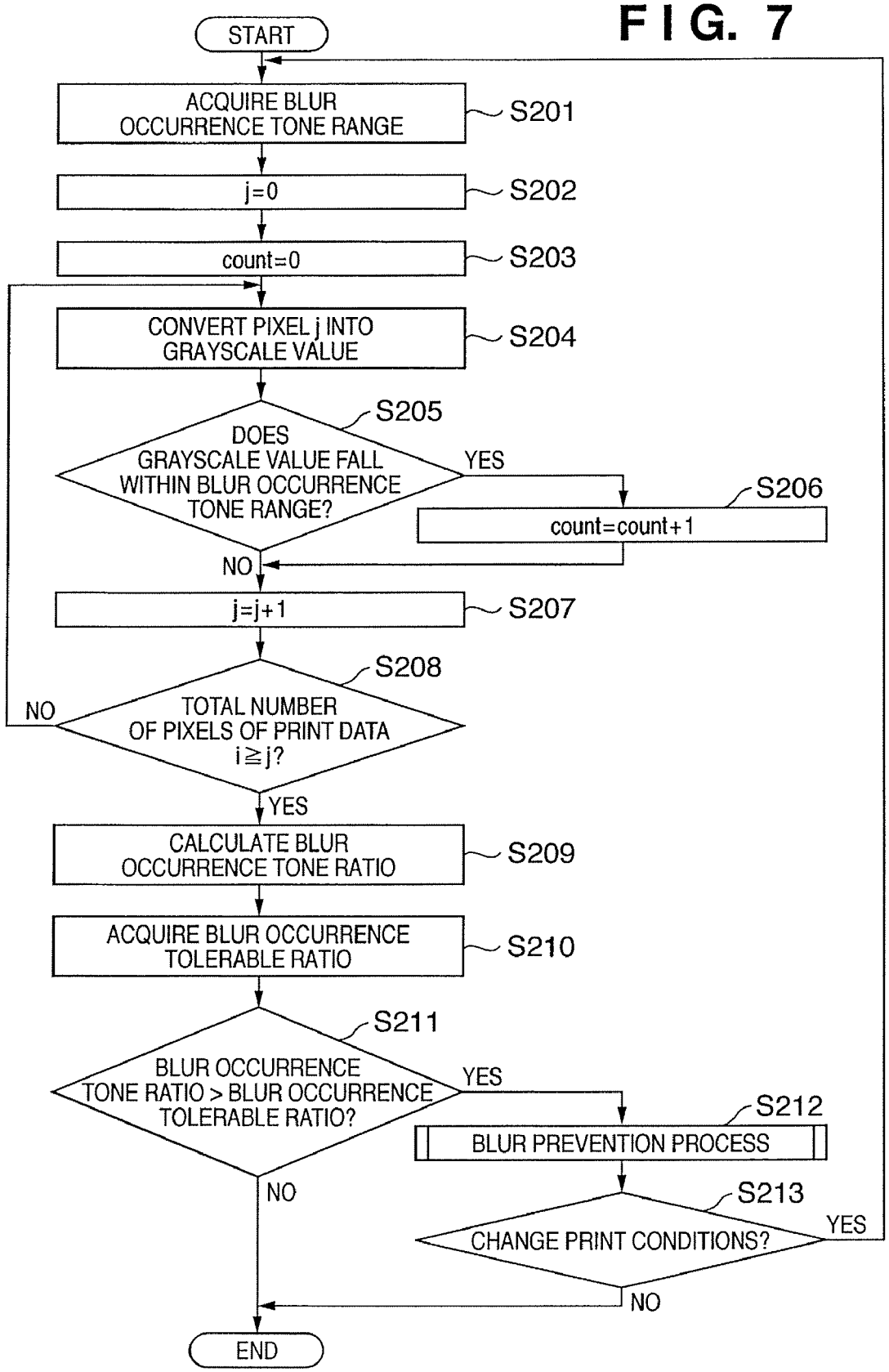
FIG. 7 is a flowchart showing details of the print data blur analysis process.

FIG. 7 is a flowchart showing details of the print data blur analysis process. This flowchart shows a process performed for print data for one image.

This process is to convert the density of each pixel of print data into a grayscale value and determine whether the grayscale value falls within a specific range (to be referred to as a blur occurrence tone range hereinafter). It is determined that a blur occurs when the ratio of the number of pixels whose values fall within the blur occurrence tone range to the total number of pixels of print data exceeds a specific ratio (to be referred to as a blur tolerable ratio hereinafter).

In step S201, the print processor 205 acquires a predefined blur generation tone range. In step S202, the print processor 205 initializes j=0, which is a number (to be referred to as a pixel specifying number j hereinafter) for designating a specific pixel of print data. In step S203, the print processor 205 initializes count=0, which is a variable (to be referred to as a blur occurrence pixel count hereinafter) for counting pixels whose values fall within the blur generation tone range.

The subsequent process is performed for each pixel of print data.

After initialization, the process advances to step S204 to convert the value of a pixel (to be referred to as a pixel j hereinafter) corresponding to the pixel specifying number j into a grayscale value Gray:

$$\text{Gray}=0.59\times G+0.3\times R+0.11\times B \quad (1)$$

In this embodiment, print data is RGB image data, and R (Red), G (Green), and B (Blue) represent brightnesses of the respective color components.

Color image data is represented not only by the RGB space, but also by another color space. In this case, conversion into a grayscale value does not comply with equation (1).

The process advances to step S205 to check whether the grayscale value calculated in step S204 falls within the blur occurrence tone range. If the print processor 205 determines that the grayscale value of the pixel j falls within the blur occurrence tone range, the process advances to step S206 to increment the blur generation pixel count by "+1". After that, the process advances to step S207. If the print processor 205 determines that the grayscale value of the pixel j does not fall within the blur occurrence tone range, the process directly advances to step S207.

The print processor 205 increments the pixel specifying number j by "+1" in step S207, and checks in step S208 whether or not determination of whether the grayscale value falls within the blur occurrence tone range ends for all the pixels of print data. Letting TOTAL be the total number of pixels of print data, if TOTAL≧j, the print processor 205 determines that the determination ends, then the process advances to step S209. If TOTAL<j, the print processor 205 determines that the determination does not end, and the process returns to step S204.

In step S209, the print processor 205 calculates the ratio (to be referred to as a blur occurrence tone ratio hereinafter) of the blur occurrence pixel count to image data:

$$\text{Blur occurrence tone ratio}=\text{blur occurrence pixel count/total number of pixels of image data} \quad (2)$$

The process advances to step S210 to acquire the ratio (to be referred to as a blur occurrence tolerable ratio hereinafter) representing the tolerance for a blur occurred after printing at the blur occurrence tone ratio calculated in step S209. The embodiment sets 60% as a fixed value common to printing systems, but the blur occurrence tolerable ratio may be set to another value. For example, a user may set a blur occurrence tolerable ratio in accordance with print conditions.

In step S211, the print processor 205 compares the blur occurrence tone ratio (Bur) calculated in step S209 with the blur occurrence tolerable ratio (BurTH) acquired in step S210. If Bur>BurTH, the print processor 205 determines that the blur is not tolerable, and the process advances to step S212. In step S212, the print processor 205 executes a blur prevention process to, for example, prompt a user to change print conditions which do not cause any blur in the printing result based on print data, details of which will be described later. In step S213, the print processor 205 checks whether the user has changed print conditions. If the print processor 205 determines that the user has changed print conditions, print data must undergo the print data blur analysis process again, and the process returns to step S201. If the print processor 205 determines that the user does not change print conditions, the process ends.

If Bur≦BurTH in step S211, the print processor 205 determines that the blur is tolerable, and the process ends.

The blur occurrence tone range will be explained.

The blur occurrence tone range is a grayscale range derived from the ink use amount at which a blur occurs in the relationship between the lightness and an ink use amount corresponding to a print condition designated by the user of the printing system.

FIG. 8 is a table showing the blur occurrence tone range when the layout count is 80. This table is called a blur occurrence tone range table.

The embodiment represents the blur occurrence tone range in the form of table, but the present invention is not limited to this. The present invention can adopt any method as far as similar information can be acquired.

FIG. 8 shows values when 8 bits of each pixel, i.e., 256 tone levels represent the grayscale, "0" represents black, and "255" represents white. A tone level min. represents the upper limit of the blur occurrence tone range, and a tone level max. represents its lower limit. The blur occurrence tone range can change depending on the paper type and print quality serving as print conditions, as shown in FIG. 8 However, it goes without saying that the values of the blur occurrence tone range are not limited to only print conditions shown in FIG. 8.

Change of the blur occurrence tone range depending on print conditions will be explained.

Figure 9:
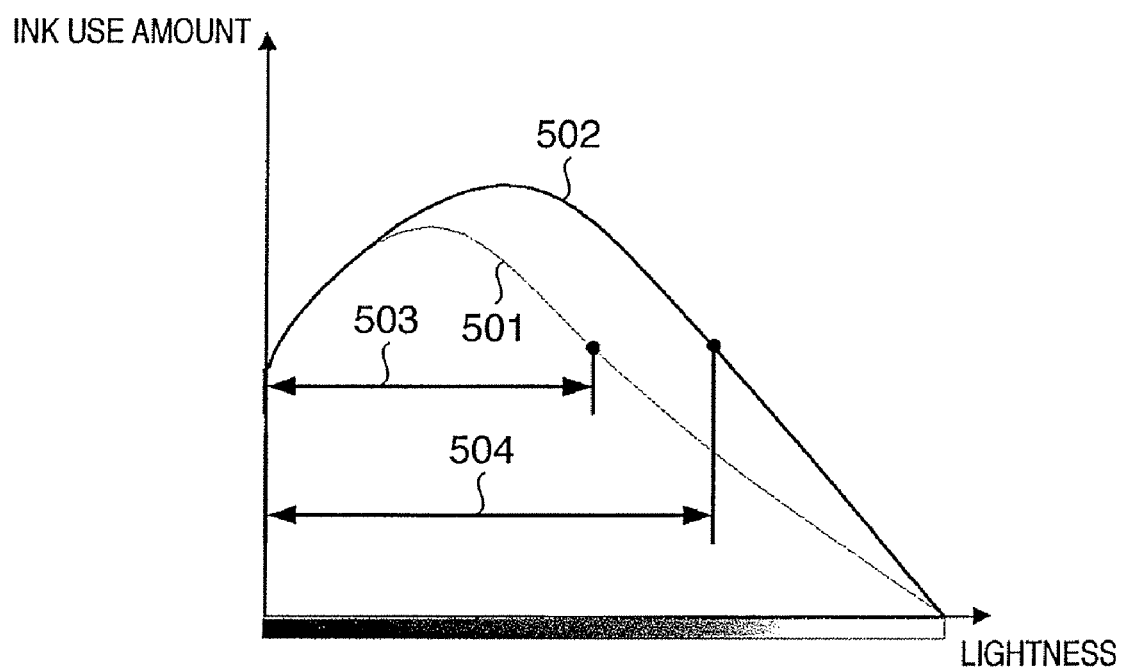
FIG. 9 is a graph showing the relationship between lightnesses at different print qualities and ink consumption amounts necessary to represent the respective print qualities when the paper type is plain paper.

FIG. 9 is a graph showing the relationship between lightnesses at different print qualities and ink consumption amounts necessary to represent the respective print qualities when the paper type is plain paper.

In FIG. 9, reference numeral 501 denotes a lightness-ink use amount curve for a print quality "fast"; and 502, a lightness-ink use amount curve for a print quality "fine". Reference numeral 503 denotes a blur occurrence tone range for the print quality "fast"; and 504, a blur occurrence tone range for the print quality "fine".

As is apparent from FIG. 9, the ink consumption amount changes depending on the print quality, so the blur occurrence tone range is wider for the quality ("fine") consuming a larger amount of ink. Since the influence of the blur maximizes at a lightness close to black, the value of the tone level min. is "0", as shown in FIGS. 8 and 9. Although not shown, when the paper type is photo paper, the paper absorptivity is high, a blur hardly occurs. Thus, the blur occurrence tone range is narrow.

Figure 10:
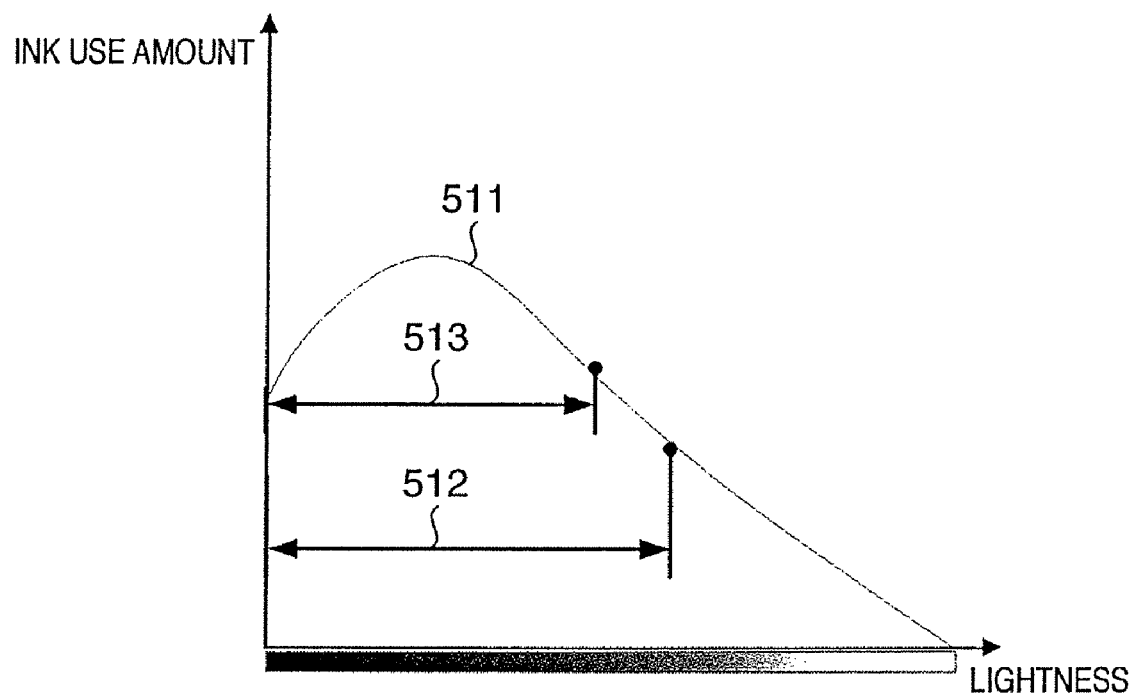
FIG. 10 is a graph showing the relationship between the lightness at the print quality "fast" and the ink consumption amount necessary to represent the print quality "fast" when the paper type is plain paper.

FIG. 10 is a graph showing the relationship between the lightness at the print quality "fast" and the ink consumption amount necessary to represent the print quality "fast" when the paper type is plain paper.

In FIG. 10, reference numeral 511 denotes a lightness-ink use amount curve; 512, a blur occurrence tone range when the layout count is set to "80" as a print condition; and 513, a blur occurrence tone range when the layout count is set to "63" as a print condition.

As the layout count decreases, the printing area for representing one image increases, reducing the visual influence of the blur. From this, the blur occurrence tone range is narrow for a small layout count, as shown in FIG. 10.

FIG. 11 is a table showing the blur occurrence tone range when the layout count is "63". As is apparent from a comparison between FIGS. 8 and 11, blur occurrence tone ranges defined by values shown in FIG. 11 are narrower than those for the layout count "80" shown in FIG. 8. In this manner, the embodiment changes the blur occurrence tone range table for use depending on the layout count.

As is apparent from FIG. 11, no blur occurs at all print qualities in the use of photo paper A, and thus no blur occurrence tone range is designated. In other words, when photo paper A is used at the layout count "63", no blur prevention process is executed.

The blur occurrence tone range determination method is not limited to the above-described one, and the blur occurrence tone range may be set to a range including all tone levels. The determination may use not only lightness but also another scale such as chromaticness. The blur occurrence tone range may also change depending on the size of the image printing area based on the reduction ratio and each print data.

A comparison between the blur occurrence tone ratio calculation method and the blur occurrence tolerable ratio will be described. For descriptive convenience, one original image will be exemplified.

Figure 12:
FIG. 12 is a view showing an image represented by image data generated by a host 101 of the printing system.

FIG. 12 shows an image represented by image data generated by the host 101 of the printing system.

Figure 13:
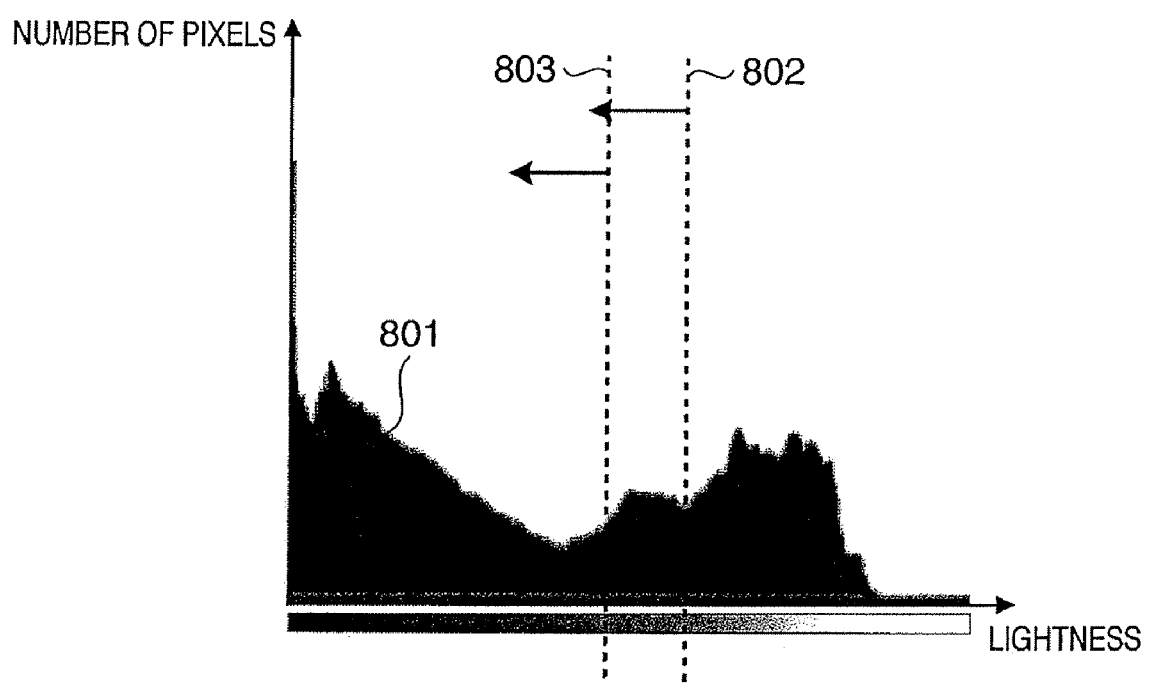
FIG. 13 is a graph showing the relationship between the lightness and the pixel count when printing the image shown in FIG. 12 with the paper type "plain paper" and the print quality "fast"

FIG. 13 is a graph showing the relationship between the lightness and the pixel count when printing the image shown in FIG. 12 with the paper type "plain paper" and the print quality "fast".

In FIG. 13, reference numeral 801 denotes a lightness-pixel count curve; 802, a blur occurrence tone level max. which is about 70% when the layout count is "80"; and 803, a blur occurrence tone level max. which is about 58% when the layout count is "63".

Since in the embodiment the blur occurrence tolerable ratio is set to 60% regardless of whatever print conditions are, the blur prevention process is performed for the paper type "plain paper", print quality "fast", and layout count "80" serving as print conditions.

The blur prevention process will be explained.

The blur prevention process is to notify a user that a "blur" will occur if performing layout printing under designated print conditions, and prompt her/him to change the print conditions.

Figure 14:
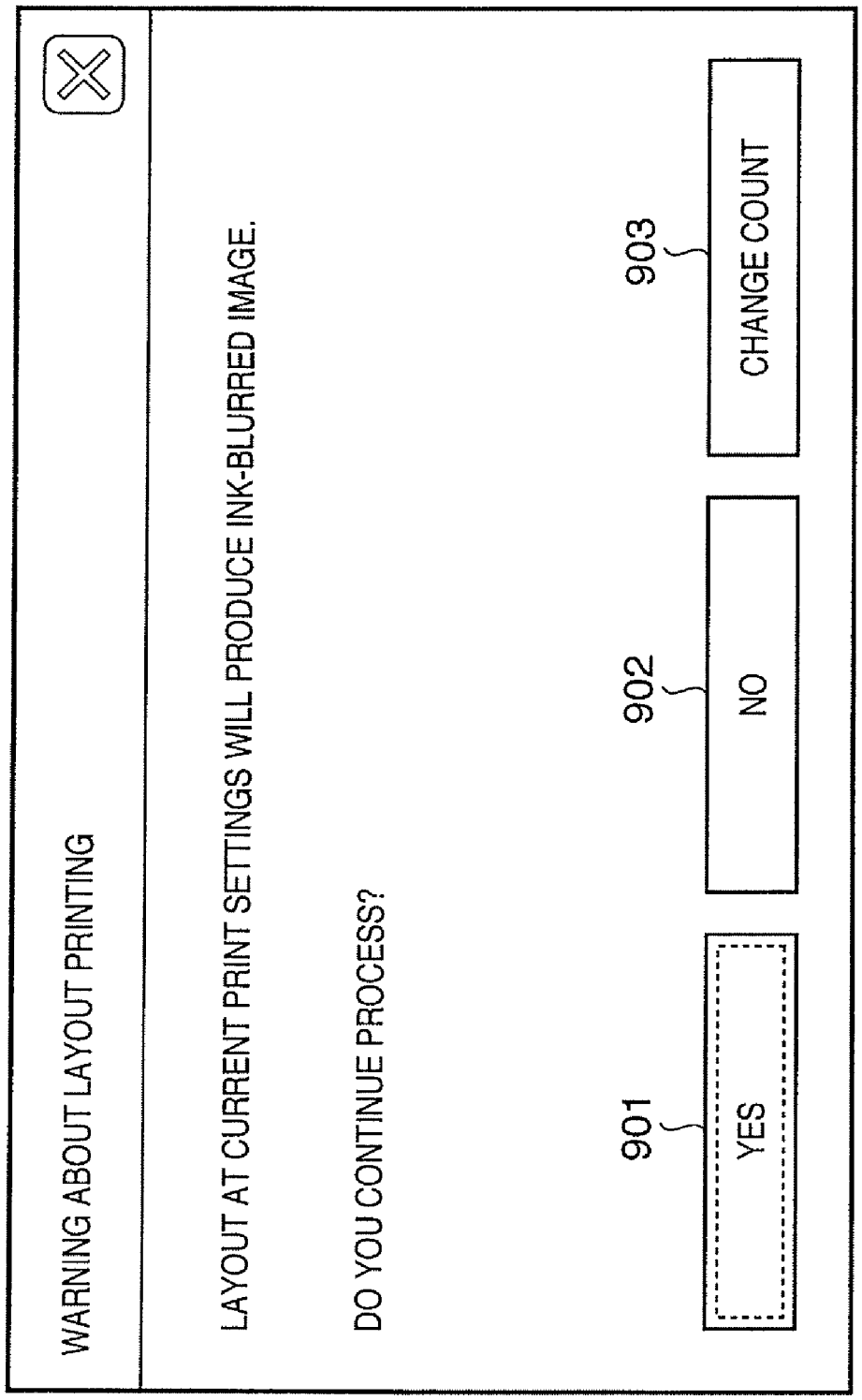
FIG. 14 is a view showing an example of a blur occurrence warning dialog displayed on the display device 104.

FIG. 14 is a view showing an example of a blur occurrence warning dialog displayed on the display device 104.

If a user selects a button 901 from the layout printing warning window, a printing process continues to produce a blurred printing result. If the user selects a button 902, the printing process stops. If the user selects a button 903, the display device 104 displays a print condition change dialog.

Figure 15:
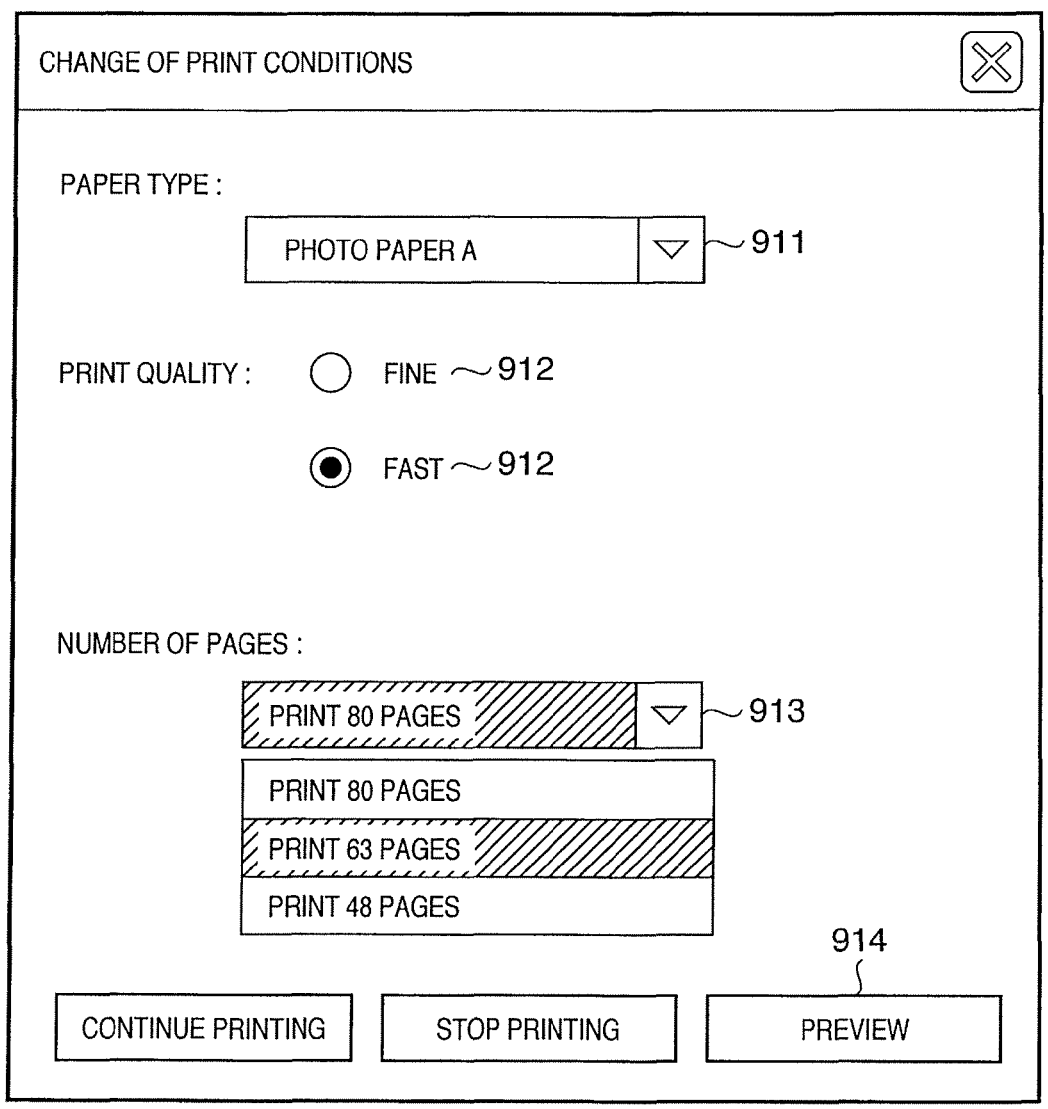
FIG. 15 is a view showing an example of a print condition change dialog.

FIG. 15 is a view showing an example of the print condition change dialog.

In FIG. 15, reference numerals 911, 912, and 913 denote fields for changing the settings of print conditions so as to prevent any blur occurrence. When the user changes the settings of print conditions, print data undergoes the print data blur analysis process again. If the user selects a button 914, the display device 104 displays a preview window reflecting print conditions designated in the fields 911, 912, and 913.

While the user is changing the settings of print conditions, the display device 104 may display a message which prompts her/him to stop changing print conditions, in addition to the message which prompts her/him to change print conditions.

Figure 16:
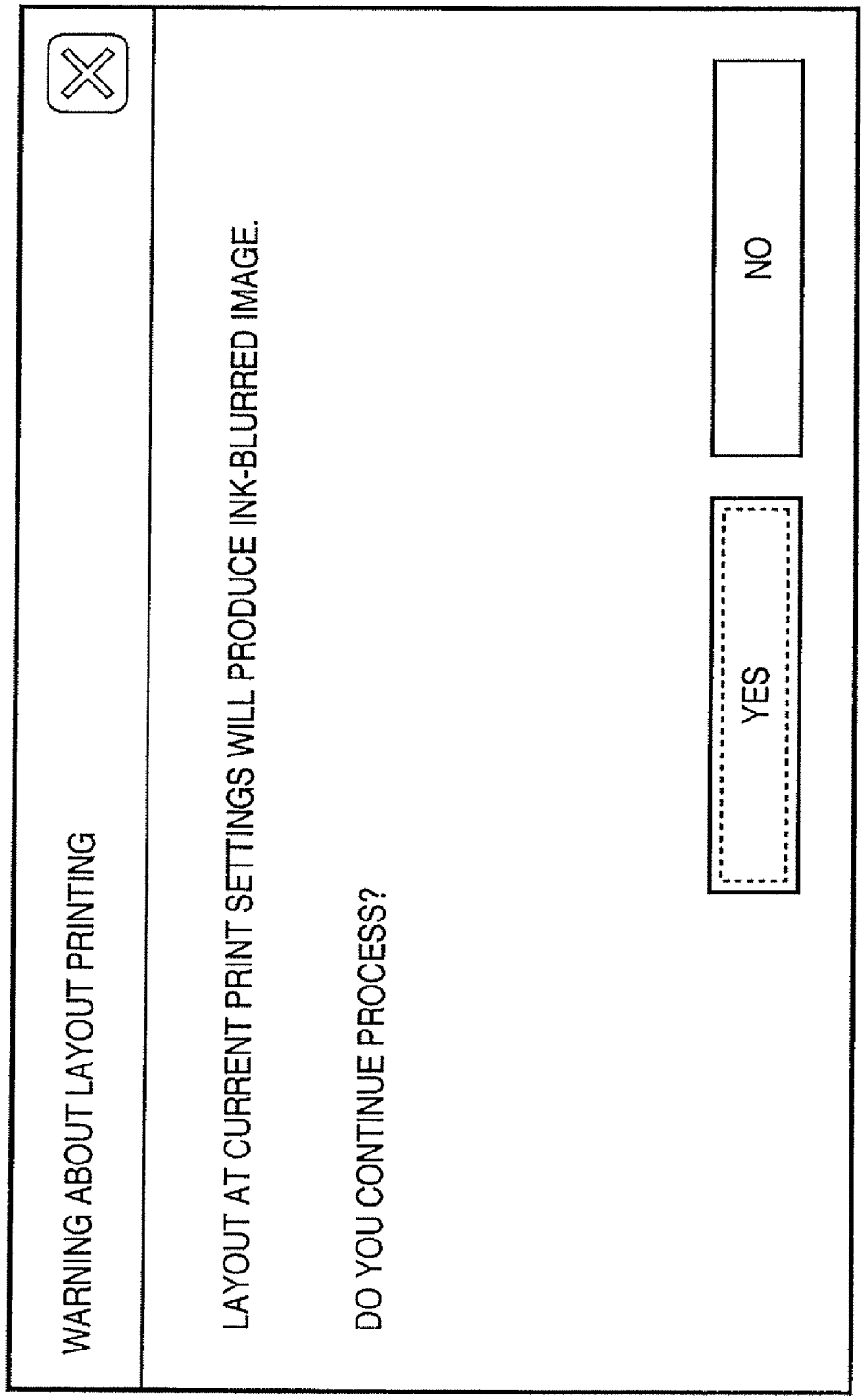
FIG. 16 is a view showing a message window which notifies a user of occurrence of a "blur"

FIG. 16 is a view showing a message window which notifies a user of occurrence of a "blur". Displaying these messages prompts the user to reconsider change of print conditions.

The print data blur analysis process is not limited to the above-described method. For example, it is also possible to obtain the ink use amount of print data, and if the ink use amount is equal to or greater than a predetermined amount, perform the blur prevention process. Depending on the print data attribute, an optimal process may be selected and executed on the basis of the blur analysis process results of different print data.

When the layout count is designated as shown in FIG. 5, the area of one image is determined according to the count. The ink amount used to print one image changes depending on the image contents. In printing relatively small-sized images, the difference in ink amount used among the images is smaller than that in printing relatively large-sized images. The greater the layout count becomes, the smaller the image-dependent difference in ink amount used to print laid-out images becomes. For this reason, the degree of blur generation may be predicted from the layout count without analyzing images to be laid out. In this arrangement, it is preferable to determine in advance a layout count at which a blur occurs seriously, and when laying out images more than the predetermined count, notify a user of this instead of immediately generating image printing data.

The degree of blur depends on the paper type such as plain paper or photo paper, so whether or not a blur occurs may be determined in consideration of the layout count and paper type. In this arrangement, the correspondence of a layout count to a printing medium type with which an image suffers an ink blur is preferably managed. In a case where a user sets, as print conditions, a layout count and printing medium type which cause an ink blur, he is notified of this. In this manner, if it is determined on the basis of the layout count and paper type that a printed image will be blurred, a warning is output to the user to prompt him to change the layout count and other print conditions, like the above-mentioned arrangement. With this arrangement, the user can print while laying out a plurality of images without any blur.

A warning message may be displayed over a preview window reflecting designated print conditions.

Figure 17:
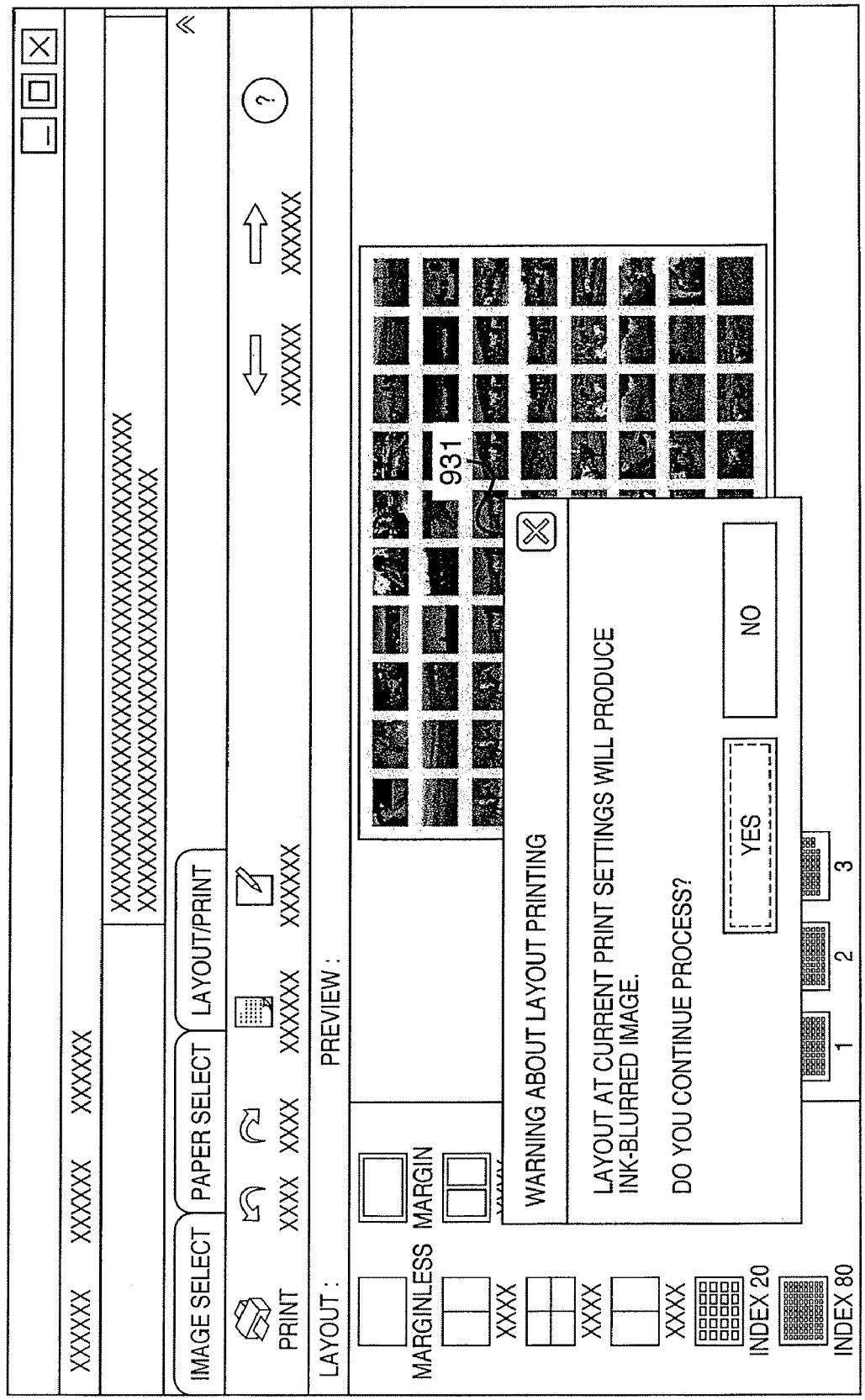
FIG. 17 is a view showing a state in which a "blur" occurrence warning dialog generated as a result of the print data blur analysis process is displayed over a preview window.

FIG. 17 is a view showing a state in which a "blur" occurrence warning dialog 931 generated as a result of the print data blur analysis process is displayed over the preview window.

According to the above-described embodiment, in a case where a "blur" occurs upon printing under print conditions designated by a user, a preview can be displayed, or a warning message can be displayed to the user. The preview or message can prompt the user to change or set again print conditions. Consequently, a high-quality "blur"-free image can be printed.

The printing system described in the embodiment may be implemented by hardware, software, or a combination thereof. The features of the printing system may be assembled in a printing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-346971, filed Nov. 30, 2005, which is hereby incorporated by reference herein in its entirety.

What is claimed is:

1. A printing system including a host apparatus which generates print data, and an inkjet printing apparatus which prints an image on a printing medium using the print data transferred from said host apparatus, wherein
said host apparatus comprises:
a generation unit adapted to generate the print data;
a setting unit adapted to set a print condition upon printing an image on the printing medium by a man-machine interactive operation by a user;
an analysis unit adapted to analyze whether or not ink blurs upon printing on the printing medium on the basis of the print data generated by said generation unit in accordance with the print condition set by said setting unit; and
a warning unit adapted to warn the user about the set print condition in accordance with an analysis result by said analysis unit,
wherein said analysis unit includes:
a conversion unit adapted to convert the print data into grayscale data;
a determination unit adapted to determine for each pixel whether or not a value of the grayscale data falls within values defining a range where a blur occurs;
a calculation unit adapted to calculate a ratio of pixels suffering a blur to all pixels of an image represented by the print data in accordance with a determination result by said determination unit;
a comparison unit adapted to compare the ratio calculated by said calculation unit with a specific threshold; and
a decision unit adapted to decide, from a comparison result by said comparison unit, whether or not an intolerable blur occurs in the image,
wherein the values defining the range where a blur occurs are variably set in accordance with a type of printing medium, a print quality of printing by the inkjet printing apparatus, and the number of images laid out on one printing medium.

2. The system according to claim 1, wherein
said host apparatus further comprises:
a transmission unit adapted to transmit the print condition set by said setting unit and the print data generated by said generation unit to said printing apparatus, and
said printing apparatus comprises:
a reception unit adapted to receive the print condition and the print data transmitted from said host apparatus; and
a printing unit adapted to print on the printing medium on the basis of the print data in accordance with the print condition received by said reception unit.

3. A method of controlling a printing system having a host apparatus which generates print data, and an inkjet printing apparatus which prints an image on a printing medium using the print data transferred from the host apparatus, comprising the steps of:
generating the print data;
setting a print condition upon printing an image on the printing medium by a man-machine interactive operation by a user;
analyzing whether or not ink blurs upon printing on the printing medium on the basis of the print data generated in the generating step in accordance with the print condition set in the setting step;
warning the user about the set print condition in accordance with an analysis result in the analyzing step; and
transferring the print condition set in the setting step and the print data generated in the generating step from the host apparatus to the printing apparatus in order to print by the printing apparatus,
wherein the analyzing step further comprises the steps of:
converting the print data into grayscale data;
determining for each pixel whether or not a value of the grayscale data falls within values defining a range where a blur occurs;
calculating a ratio of pixels suffering a blur to all pixels of an image represented by the print data in accordance with a determination result;
comparing the calculated ratio with a specific threshold; and
deciding, from a comparison result, whether or not an intolerable blur occurs in the image,
wherein the values defining the range where a blur occurs are variably set in accordance with a type of printing medium, a print quality of printing by the inkjet printing apparatus, and the number of images laid out on one printing medium.

4. A host apparatus which generates print data and transfers the generated print data to an inkjet printing apparatus, comprising:
a generation unit adapted to generate the print data;
a setting unit adapted to set a print condition upon printing an image on a printing medium in the inkjet printing apparatus by a man-machine interactive operation by a user;
an analysis unit adapted to analyze whether or not ink blurs upon printing on the printing medium by the inkjet printing apparatus on the basis of the print data generated by said generation unit in accordance with the print condition set by said setting unit; and
a warning unit adapted to warn the user about the set print condition in accordance with an analysis result by said analysis unit,
wherein said analysis unit includes:
a conversion unit adapted to convert the print data into grayscale data;
a determination unit adapted to determine for each pixel whether or not a value of the grayscale data falls within values defining a range where a blur occurs;
a calculation unit adapted to calculate a ratio of pixels suffering a blur to all pixels of an image represented by the print data in accordance with a determination result by said determination unit;
a comparison unit adapted to compare the ratio calculated by said calculation unit with a specific threshold; and
a decision unit adapted to decide, from a comparison result by said comparison unit, whether or not an intolerable blur occurs in the image,
wherein the values defining the range where a blur occurs are variably set in accordance with a type of printing medium, a print quality of printing by the inkjet printing apparatus, and the number of images laid out on one printing medium.

5. The apparatus according to claim 4, wherein said warning unit displays, on a screen, a message which prompts the user to stop printing.

6. The apparatus according to claim 4, wherein said warning unit displays, on a screen, a message which prompts the user to change a setting of the print condition.

7. The apparatus according to claim 6, further comprising a preview unit adapted to preview, on the screen, an image printed under the print condition whose setting is changed in accordance with the message.

8. A non-transitory computer-readable medium storing a computer program which executes, in a host computer, the steps of:

generating print data;

setting a print condition upon printing an image on a printing medium by a man-machine interactive operation by a user;

analyzing whether or not ink blurs upon printing on the printing medium on the basis of the generated print data in accordance with the set print condition;

warning the user about the set print condition in accordance with an analysis result; and transferring the set print condition and the generated print data from a host computer to an inkjet printing apparatus in order to print by the inkjet printing apparatus, wherein the analyzing step further comprises steps of:

converting the print data into grayscale data;

determining for each pixel whether or not a value of the grayscale data falls within values defining a range where a blur occurs;

calculating a ratio of pixels suffering a blur to all pixels of an image represented by the print data in accordance with a determination result;

comparing the calculated ratio with a specific threshold; and deciding, from a comparison result, whether or not an intolerable blur occurs in the image, wherein the values defining the range where a blur occurs are variably set in accordance with a type of printing medium, a print quality of printing by the inkjet printing apparatus, and the number of images laid out on one printing medium.

* * * * *